United States Patent [19]

Platt

[11] 3,865,385

[45] Feb. 11, 1975

[54] SOUND REPRODUCTION APPARATUS WITH IMPROVED ACCOUSTICAL TRANSMISSION MEANS

[75] Inventor: Stephen A. Platt, Grand Haven, Mich.

[73] Assignees: Steven A. Platt, Grand Haven, Mich.; Vernon B. Platt, both of Grand Haven, Mich.

[22] Filed: Sept. 20, 1973

[21] Appl. No.: 399,122

[52] U.S. Cl. .................................... 274/25, 274/16

[51] Int. Cl. ............................................ G11b 3/02

[58] Field of Search ....... 274/24, 25, 16, 23 R, 1 A, 274/1 R

[56] References Cited

UNITED STATES PATENTS

| | | | |
|---|---|---|---|
| 1,080,953 | 12/1913 | Catucci | 181/32 R |
| 1,364,201 | 1/1921 | Laurencich | 274/24 A |
| 1,443,961 | 2/1923 | Matyas | 274/25 |
| 1,709,391 | 4/1929 | Davis | 274/25 |
| 1,720,515 | 7/1929 | Hinckley | 274/24 R |
| 2,837,340 | 6/1958 | Duncan | 274/25 |
| 2,905,260 | 9/1959 | Williams | 181/32 R |
| 3,553,392 | 1/1971 | Liebscher | 181/32 R |
| 3,822,064 | 7/1974 | Meier-Maletz | 274/25 |

*Primary Examiner*—Richard E. Aegerter
*Assistant Examiner*—John W. Shepperd
*Attorney, Agent, or Firm*—Price, Heneveld, Huizenga & Cooper

[57] ABSTRACT

A sound reproducing apparatus capable of manual operation to reproduce audio information recorded in a spiral groove in a disc includes a base member which rotatably supports a turntable for rotating a disc recording. A pick-up arm is pivotally mounted to the base to extend over the turntable and includes bias means for reducing the tracking weight of the arm. The pick-up arm includes a planar member of expanded polymeric material having integral surface skins on opposite sides thereof and anchored to the arm along a portion of its edge. The member includes a pick-up stylus which engages the spiral groove on the recording disc to transmit accoustical energy to the transducer so formed.

10 Claims, 12 Drawing Figures

SOUND REPRODUCTION APPARATUS WITH IMPROVED ACCOUSTICAL TRANSMISSION MEANS

BACKGROUND OF THE INVENTION

The present invention relates to a manually operated sound reproduction apparatus and specifically to improved means for transmitting accoustical energy.

Mechanical sound reproduction apparatus (i.e., devices not employing electrical pick-up and amplification means) of the type employing either mechanical or manual drive means have employed a variety of pick up devices. These respond to perturbations in a groove of a disc recording corresponding to recorded information, in efforts to effect an audio output signal therefrom of sufficient amplitude and frequency range to provide usable output signals therefrom. Early devices employed hollow conical pick-up arms with a needle mounted thereto for vibrating a diaphragm in communication with a narrowed end of the arm which acted somewhat as an amplifier for the accoustical waves radiated by the vibrating diaphragm. Although such devices worked adequately well with early recordings, with the advent of microgroove recordings of modern vintage, such devices were incapable of dependably tracking microgroove recorded discs due in part to the relatively high mass of the tone arm so employed. In addition, however, the tracking weight of up to an ounce or even more causes excessive wear on microgroove recordings, thereby rapidly wearing them with a resulting concurrent deterioration of fidelity.

Some attempts have been made to provide relatively inexpensive manually actuated sound reproduction apparatus using a generally planar accoustical radiator made of paperboard. U.S. Pat. No. 2,859,974 issued to J. Jauquet on Nov. 11, 1958 and U.S. Pat. No. 3,415,526 issued to J. S. Wyener on Dec. 10, 1968 represent such attempts. These devices, although inexpensive and manually actuated by the user, are of such crude construction that they are incapable of tracking microgroove records due in part to the coupling of the sound radiator to the base of the device. In addition, however, the tracking weight of the sound radiator to the disc by a stylus coupled to the sound radiator is excessive and will cause rapid deterioration of microgroove recordings. More importantly, however, the paperboard radiators disclosed in these patents are incapable of providing relatively high amplitude output signals for group listening or signals of a frequency range suitable for reproduction of musical recordings.

My copending application entitled SOUND REPRODUCTION APPARATUS, the original of which was filed on Jan. 19, 1972 (Ser. No. 219,105), now abandoned in favor of a continuation-in-part application filed May 14, 1973, Ser. No. 359,795, discloses a sound reproduction apparatus representing a significant improvement over these relatively crude devices and which is capable of providing a relatively wide dynamic range of sound reproduction suitable for voice reproduction and limited musical reproduction at amplitudes capable of individual or small group listening. Although the device therein disclosed represents a significant advance in the manual sound reproduction art, the apparatus of the present invention represents still a further advance by providing an improved accoustic radiator capable of expanded frequency response and greater amplitude output, even sufficient for group listening, while providing even more simplified construction.

My concurrently filed application entitled SOUND REPRODUCTION APPARATUS discloses an improved sound radiating panel of relatively large dimensions which is capable of providing a wide dynamic range of sound suitable for voice and limited musical reproduction at amplitudes capable of group listening. Although the device disclosed therein represents a significant advance in the art, the present invention represents still a further advance achieved in part by providing a smaller accoustical transducer capable of mounting within a protective pick-up arm and providing expanded frequency response at an output amplitude sufficient for group listening.

SUMMARY OF THE INVENTION

The sound reproduction apparatus of the present invention employs a transducer comprising a planar member of foam polymeric material having integral surface skins on opposite sides thereof. The member is anchored to a pick-up arm by bonding a portion of the surface skins along an edge of the member to the pick-up arm. A pick-up stylus is mounted to an edge of the member opposite from its coupling to the pick-up arm to transmit mechanical perturbations in the groove of a prerecorded disc to the member. The arm is mounted at the end opposite the transducer so formed to a base by means of a spring biased pivot assembly.

The pick-up arm encloses the transducer and includes a plurality of perforations to permit accoustical radiation from the planar member outwardly therefrom. The pick-up arm also includes an open end adjacent the pivot assembly and means for coupling open ends of a pair of tubes forming earphones to face the open end of the pick-up arm for providing individual listening when using the playback apparatus.

It is an object, therefore, of the present invention to provide a sound reproduction apparatus with an improved accoustical transducer mounted to a pick-up arm.

Another object of the present invention is to provide improved means for coupling a pick-up arm to the base of a sound reproduction apparatus.

A further object of the present invention is to provide a hollow pick-up arm enclosing an accoustical transducer at one end and an open opposite end for cooperating with ends of earphone tubes for individual listening.

Still a further object of the present invention is to provide a sound reproduction apparatus with an improved pick-up arm including transducing means bonded thereto.

An additional object of the present invention is to provide improved earphones for individual listening.

These and other objects of the present invention will become apparent upon reading the following description thereof together with the accompanying drawings in which:

DETAILED DESCRIPTION OF THE PREFERRED EMBODIMENT

Figure 1:
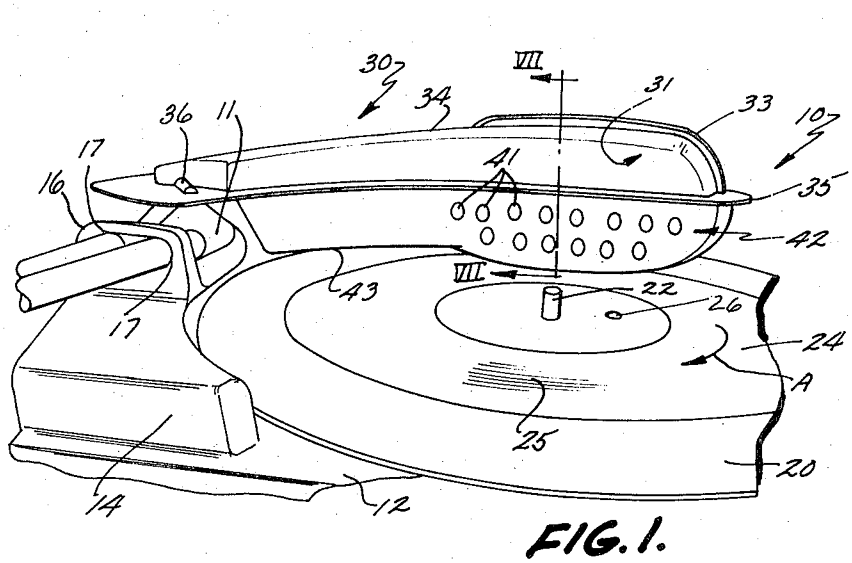
FIG. 1 is a fragmentary perspective view of the sound reproduction apparatus embodying the present invention.

Referring now to FIG. 1, there is shown the improved sound reproduction apparatus 10 comprising a base member 12 of vacuum formed polymeric material and including a raised plateau 14 along one edge thereof and including a mounting boss 16 with apertures 17 extending horizontally therethrough. A pair of accoustical transmitting tubes 18 and 19, which communicate with the earphone shown in FIGS. 10–12, extend through apertures 17 to cooperate with the pick-up arm 30 as described below.

Mounted to base 12 is a turntable platen 20 by means of a bearing assembly (not shown) substantially identical to that disclosed in my concurrently filed application entitled SOUND REPRODUCTION APPARATUS, which application is incorporated herein by reference. Extending upwardly from the center of turntable 20 is a spindle 22 for receiving a disc recording 24 having a spiral groove 25 therein in which audio information is recorded in the form of mechanical perturbations within the groove. Recording 24 includes an aperture 26 aligned with a similar aperture within turntable 20 to permit manual rotation of the disc in a direction indicated by arrow A in FIG. 1 by means of a pencil or like instrument.

A speed regulator (not shown) of the type described in my copending application entitled SPEED REGULATOR FOR MANUALLY OPERATED SOUND PRODUCTION APPARATUS filed May 30, 1972, Ser. No. 257,698 (also incorporated herein by reference) is mounted to the base and engages the periphery of turntable 20 to facilitate constant speed rotation thereof.

Figure 2:
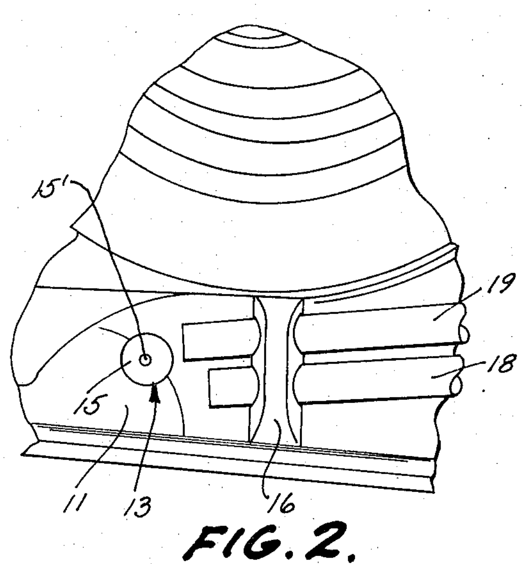
FIG. 2 is an enlarged, fragmentary plan view of a portion of the base assembly shown in FIG. 1.

Base 12 further includes a mounting boss 11 integrally formed with and extending upwardly from plateau 14 as seen in FIGS. 1 and 2 for mounting the pick-up arm 30. As best seen in FIG. 2, mounting boss 11 includes a nylon bushing fitted in an aperture formed downwardly through mounting boss 11 and cemented to the boss. Bushing 13 has a flat horizontally extending upper bearing surface 15 and a central aperture 15' for receiving a downwardly extending pin of the pick-up arm assembly 30.

The pck-up arm assembly 30 comprises upper and lower vacuum formed sections 32 and 42 forming a hollow arm with an enlarged front portion enclosing the accoustical transducer with opposite side walls 29 and 31. The sections are cemented together along a seam 35 joining a peripheral flange 27 of section 32 to a peripheral flange 28 of section 42 after the accoustical transducer and pivot assemblies have been mounted in arm 30 as described below. The arm sections are formed of a polymeric material such as polystyrene which, in the preferred embodiment, was approximately one thirty-second inch thick.

Figure 3:
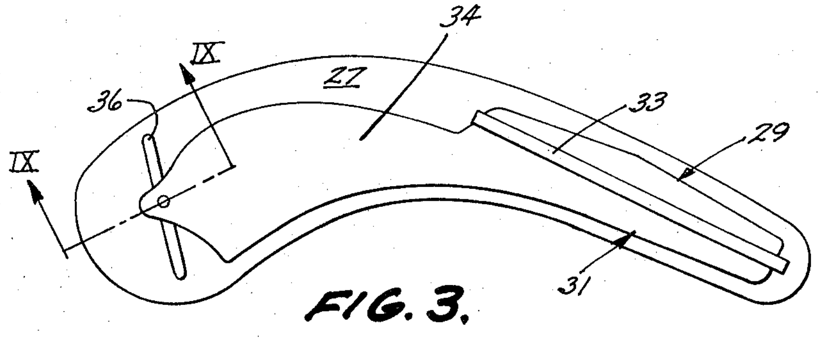
FIG. 3 is a top plan view of the pick-up arm shown in FIG. 1.
Figure 6:
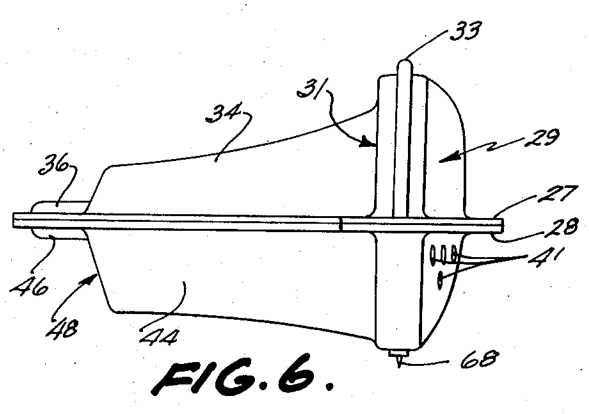
FIG. 6 is a front end elevational view of the pick-up arm shown in FIG. 3.
Figures 7, 8, 9:
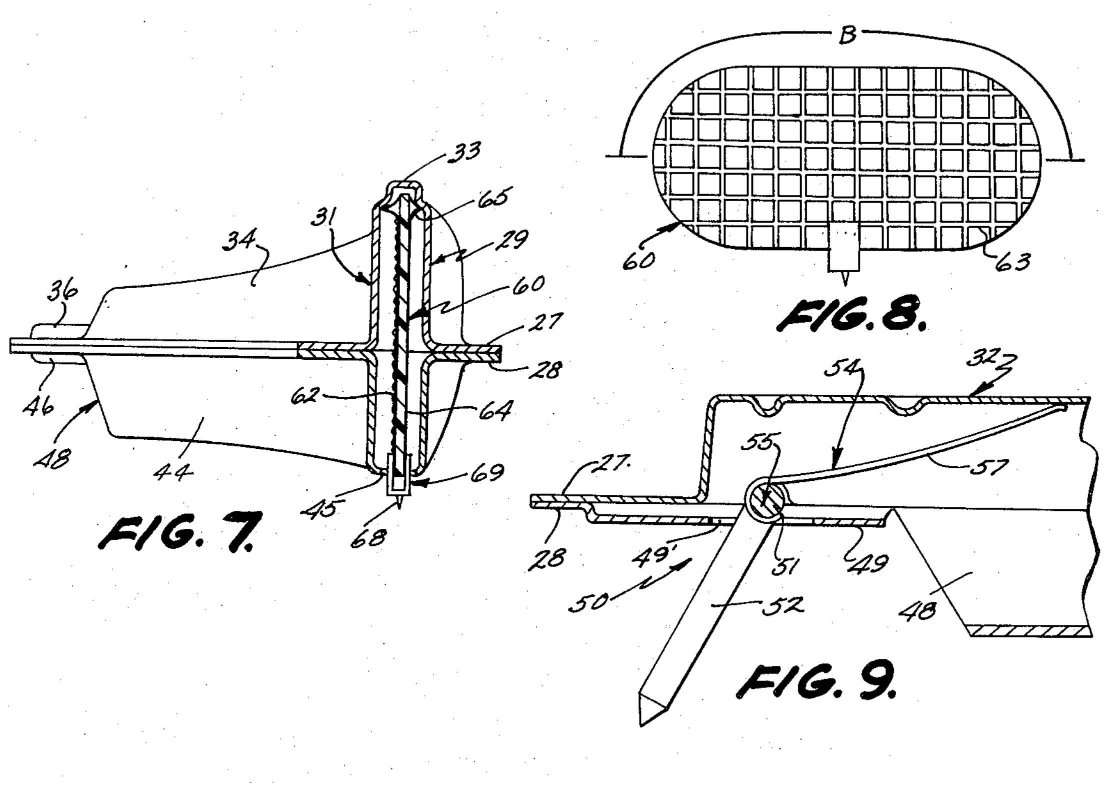
FIG. 7 is a cross-sectional view through the front of the pick-up arm taken along the section lines VII—VII of FIG. 1.
FIG. 8 is a side elevational view of the accoustical transducer and pick-up stylus mounted thereto.
FIG. 9 is a fragmentary cross-sectional view taken through the pivot mount assembly of the pick-up arm and taken along section lines IX—IX of FIG. 3.

The upper section 32 includes a recess 33 formed therein to receive a sound transducer 60 as best seen in FIG. 7. As seen in FIGS. 3 and 6, the upper section 32 also includes a curved elongated portion 34 defining the upper portion of an accoustical transmitting channel which communicates between the front end of the pick-up arm to the rear end which is pivotally mounted to the base. Adjacent the rear end there is formed within the upper member 32 a semicircular recess 36 which operates in conjunction with the mating recess 46 in the lower shell 42 to rotatably couple the cross member of a pivot assembly to arm 30 as described below.

The lower section 42 also includes a curved elongated portion 44 defining the lower portion of the accoustical transmission channel extending from the front of the arm to an opening 48 at the rear of the arm. A plurality of apertures 41 are formed through the lower portion of side walls 29, 31, as best seen in FIGS. 1, 5 and 6, to permit accoustical waves generated by the vibrating accoustical transducer 60 to be radiated outwardly for group listening.

Figure 4:
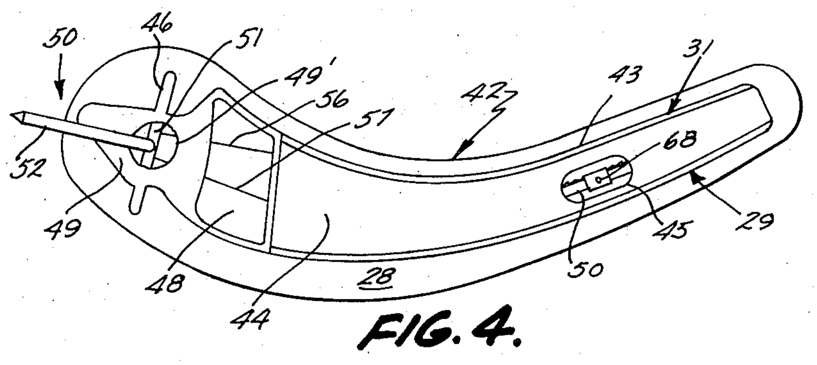
FIG. 4 is a bottom plan view of the pick-up arm shown in FIG. 3.

As seen in FIG. 4, the lower edge of section 42 defines a narrowed section having a centrally located aperture 45 permitting a stylus 68 coupled to the transducer 60 to extend therethrough. The inclined generally rectangular aperture 48 formed at the rear of the lower section 42 faces the open ends of tubes 18 and 19 held within boss 16 as seen in FIGS. 1 and 2.

Section 42 also includes a semicircular pivot cross arm receiving portion 46 as best seen in FIGS. 4 and 7. A plateau 49 is formed near the rear edge of member 42 and includes an aperture 49' centrally located therein to permit a downwardly depending pin 52 of the pivot assembly 50 to extend therethrough. The area of plateau 49 surrounding aperture 49' forms a bearing surface which engages surface 15 of bushing 13 mounted to the base.

Figure 5:
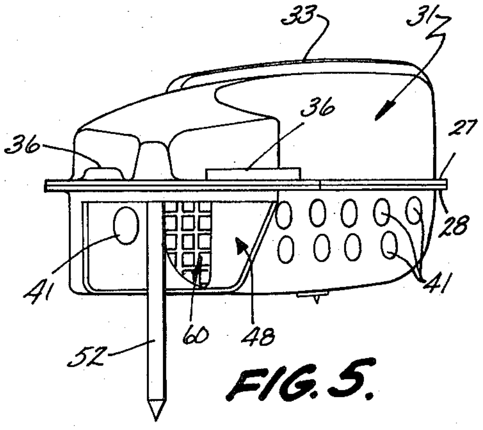
FIG. 5 is a rear end elevation of the pick-up arm shown in FIG. 3.

Pivot assembly 50 includes, as best seen in FIGS. 4, 5 and 9, a generally T-shaped member 55 with a cross member 51 and pin 52. Arm 51 fits freely within the cylindrical recess formed by segments 36 and 46 of the upper and lower sections, respectively, of the arm to permit movement for raising and lowering the arm. The downwardly projecting pin 52 is fitted into aperture 15' of bushing 13 and permits rotation of the arm for tracking of stylus 68 in the record groove.

In addition, pivot assembly 50 further includes biasing means extending between the T-shaped member 55 and the pick-up arm 30 to reduce the stylus pressure on the recording during playback operation. The biasing means comprises a spring wire 54 having legs 56 and 57 engaging the inner upper surface of member 32 as best seen in FIGS. 4 and 9. Wire 54 extends around the downwardly depending pin 52 at the junction of the pin with the cross member 51, as seen in FIGS. 4 and 9, to bias pin 52 in a rearward position prior to the installation of the pick-up arm on the base. Once installed, the bias means so formed will counter the weight of the pick-up arm such that it will track at approximately 3–5 grams suitable for reproduction of microgroove records.

The accoustical transducer 60 employed with the pick-up arm comprises a planar member generally elliptical in shape (FIG. 8) and made of expanded polymeric material such as polystyrene. The member is cut from a sheet of expanded polymeric material extruded through a pair of heated dies such that integral surface skins 62 and 64 are formed on opposite sides thereof as seen in FIG. 7. One side of the panel 50 employed in the preferred embodiment had a plurality of waffle indentations 63 formed by pressing the member after extrusion. Indentations 63 increase the surface tension of skin 62 on one side of the panel tending to bow the panel slightly. It is believed that the unequal surface tension of one skin relative to the other, enhanced by the waffling, together with the anchoring to the arm, as described below, accounts for the excellent fidelity of reproduction as well as amplitude of resultant audio output signal. Enhancement of the differential surface tension could conceivably be accomplished by other methods and need not be formed by pressing waffle-like indentations as shown in the preferred embodiment.

Transducer 60 is bonded to the pick-up arm by an adhesive such as rubber cement. Specifically, the upper edge zone of member 60 is cemented within the trough 33 in the upper section 32 by means of adhesive 65 as shown in FIG. 7. In the preferred embodiment, the edge portion spanning the arc indicated by B in FIG. 8 is cemented to include a significant portion of the surface skins adjacent the edge and extending therealong. It is noted here that surface skins 62 and 64 are securely anchored to the arm as well as the edge of the member by first filling the trough with adhesive and then fitting the edge of the transducer therein. By so anchoring the transducer, the surface skins are maintained with their relative tension differential to achieve the desired results.

A stylus 68 is coupled to the edge of the panel opposite its junction with arm 30. Stylus 68 is supported by a stylus assembly 69 constructed in accordance with the construction set forth in my copending application entitled SOUND REPRODUCTION APPARATUS filed on Jan. 19, 1972, Ser. No. 219,105, abandoned in favor of a continuation-in-part application entitled SOUND REPRODUCTION APPARATUS filed on May 14, 1973, Ser. No. 359,795 and incorporated herein by reference.

The stylus assembly basically comprises a U-shaped clip which is crimped to the lower edge of the transducer and can be cemented thereto if desired. As seen in FIG. 7, the bottom of the U-shaped clip is spaced from the bottom edge of member 60 somewhat to permit the stylus 68 bonded thereto to extend from the housing defined by members 32 and 42 for engaging the record groove during playback operation.

Figure 10:
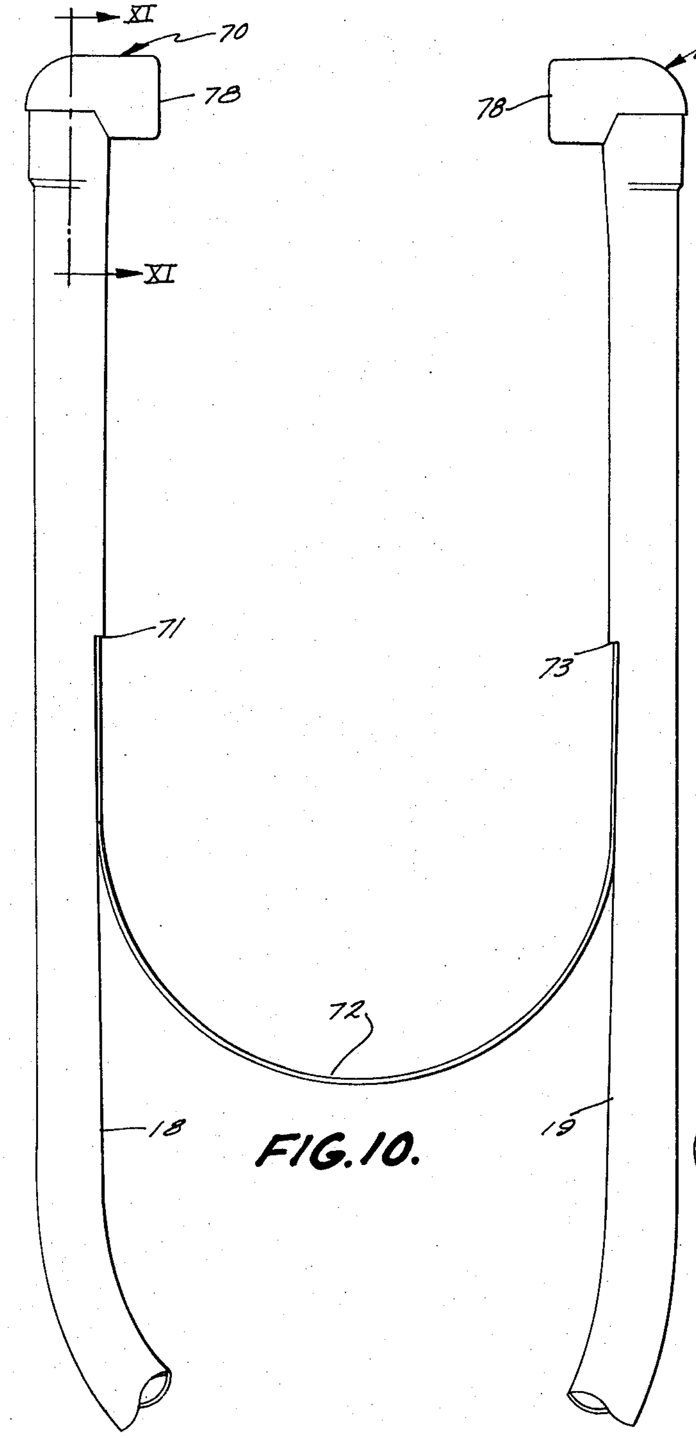
FIG. 10 is a fragmentary front elevational view of the improved earphones employed with the sound reproduction apparatus for individual listening.
Figure 11:
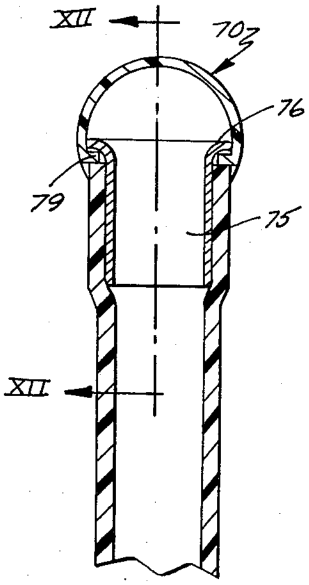
FIG. 11 is an enlarged cross-sectional view of one of the ear pieces employed with the earphones shown in FIG. 10 and taken along the section lines XI—XI of FIG. 10.
Figure 12:
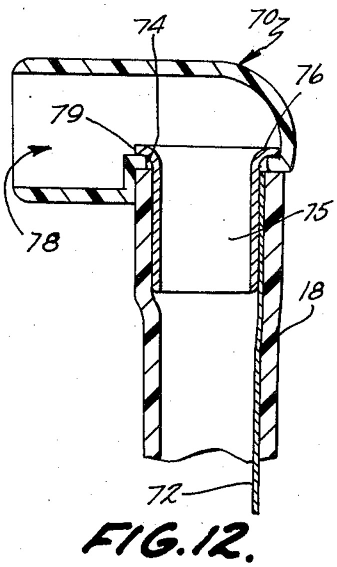
FIG. 12 is a cross-sectional view of the ear piece shown in FIG. 11 taken along the section lines XII—XII of FIG. 11.

The earphones which can be employed with the sound reproduction apparatus of the present invention include, as best seen in FIGS. 10–12, flexible sound transmission tubes 18 and 19 which, as also seen in FIG. 2, are held within the mounting boss 16 such that their open ends face aperture 48 in the pick-up arm. Tubular members 18 and 19 are terminated on the opposite ends by identical ear pieces 70. The ear pieces are biased toward one another to hold the earphones to the head of the user by means of a U-shaped spring or band 72 which is relatively flat in cross section, which extends into members 18 and 19 through slots 71 and 73 therein. The ends of band 72 are secured between ferrules 75 force-fitted into the ends 74 of the tubes, and the tubes.

Ferrules 75 each include a top peripheral flange 76 extending therearound and spaced slightly from the open end 74 of each of the ear pieces as best seen in FIGS. 11 and 12. Each ear piece 70 comprises a hollow member of resilient polymeric material having an open end 78 adapted to fit within the ear of a user. Each ear piece includes an aperture opening orthogonally to aperture 78 at an opposite end and having a peripheral lip 79 which snap-fits over flange 76 of the ferrule to secure the ear piece to the ferrule as shown. This structure provides a relatively inexpensive earphone which can be employed with the sound production apparatus of the present invention for individual listening where ambient noise may interfere with the normal operation of the playback apparatus. In some embodiments, a single ear piece and tube will suffice. Also, tubes 18 and 19 can be coupled to a Y connector such that a single tube extends to the reproduction apparatus.

Once this illustrative embodiment of the invention is understood by those in the art, its utter simplicity is striking. And, when the invention is employed, the excellent accoustical fidelity and amplitude of output cause this simple device to be even more impressive.

It will become apparent to those skilled in the art that various modifications to the present invention may be made by, for example, substituting materials for those described herein and employed in the preferred embodiment. Also, transducer 70 may be modified as, for example, by providing a different pattern of indentations on one surface thereof, or in some instances, eliminating the indentations entirely. These and other modifications to the present invention will, however, fall within the scope and spirit of the invention as defined by the appended claims.

The embodiments of the invention in which an exclusive property or privilege is claimed are defined as follows:

1. In a sound reproduction apparatus for reproducing audio information recorded as perturbations formed in a groove of a disc recordings, improved pick-up means therefor comprising:

a generally planar member formed of expanded polymeric material with integral surface skins on opposite surfaces thereof and having peripheral edge portions;

a pick-up stylus coupled to one of said edge portions of said generally planar member;

support means comprising a pick-up arm adapted to position said generally planar member with said stylus in operative engagement with a recording, said pick-up arm including a recess at one end for receiving a second edge portion of said generally planar member; and means for bonding said second edge portion of said generally planar member in said pick-up arm recess, opposite said one edge portion to which said pick-up stylus is coupled, and for bonding adjacent portions of said surface skins on opposite sides of said generally planar member to said pick-up arm.

2. The apparatus as defined in claim 1 wherein said pick-up arm is hollow and encloses said generally planar member and including an aperture therein providing a passageway through which said stylus extends to engage a recording, said pick-up arm including means permitting transmission of accoustical energy therefrom.

3. In a sound reproduction apparatus for reproducing audio information recorded as perturbations formed in a groove of a disc recording, improved pick-up means therefor comprising:

a generally planar member formed of expanded polymeric material with integral surface skins on opposite surfaces thereof and having peripheral edge portions;

a pick-up stylus coupled to one of said edge portions of said generally planar member;

support means adapted to position said generally planar member with said stylus in operative engagement with a recording;

means for bonding to said support means a second edge portion of said generally planar member, opposite said one edge portion to which said pick-up stylus is coupled, and for bonding adjacent portions of said surface skins on opposite sides of said generally planar member to said support means;

said support means comprising a hollow pick-up arm enclosing said generally planar member and including an aperture therein providing a passageway through which said stylus extends to engage a recording, said pick-up arm including means permitting transmission of accoustical energy therefrom; and said pick-up arm including a recess at one end for receiving said second edge portion of said generally planar member.

4. The apparatus as defined in claim 3 wherein said one end of said pick-up arm includes a pair of walls on opposite sides of and spaced from said generally planar member and wherein said means permitting transmission of accoustical energy therefrom comprises a plurality of apertures formed through said walls.

5. The apparatus as defined in claim 4 wherein said means permitting transmission of accoustical energy from said pick-up arm further includes an opening at an end of said pick-up arm opposite said one end.

6. For use in a sound reproduction apparatus for reproducing audio information stored on a recording, an improved accoustical transducer comprising:

a generally planar member formed of expanded polymeric material with integral surface skins on opposite surfaces thereof and having peripheral edge portions;

a pick-up stylus coupled to one of said edge portions of said generally planar member;

support means comprising a pick-up arm adapted to hold said generally planar member with said stylus in operative engagement with a recording, said pick-up arm including means at one end for receiving a second edge portion of said generally planar member; and means for securing to said pick-up arm a significant portion of said surface skins, and an adjacent edge portion of said generally planar member, on opposite sides of said generally planar member.

7. The apparatus as defined in claim 6 wherein said support means comprises a hollow pick-up arm enclosing said generally planar member and including an aperture therein providing a passageway through which said stylus extends to engage a recording, said pick-up arm including means permitting transmission of accoustical energy therefrom.

8. For use in a sound reproduction apparatus for reproducing audio information stored on a recording; an improved accoustical transducer comprising:

a generally planar member formed of expanded polymeric material with integral surface skins on opposite surfaces thereof and having peripheral edge portions;

a pick-up stylus coupled to one of said edge portions of said generally planar member;

support means adapted to hold said generally planar member with said stylus in operative engagement with a recording;

means for securing to said support means a significant portion of said surface skins, and an adjacent edge portion of said generally planar member, on opposite sides of said generally planar member;

said support means comprising a hollow pick-up arm enclosing said generally planar member and including an aperture therein providing a passageway through which said stylus extends to engage a recording, said pick-up arm including means permitting transmission of accoustical energy therefrom;

said pick-up arm including a recess at one end for receiving said second edge portion of said generally planar member.

9. The apparatus as defined in claim 8 wherein said one end of said pick-up arm includes a pair of walls on opposite sides of and spaced from said generally planar member and wherein said means permitting transmission of accoustical energy therefrom comprises a plurality of apertures formed through said walls.

10. The apparatus as defined in claim 9 wherein said means permitting transmission of accoustical energy from said pick-up arm further includes an opening at an end of said pick-up arm opposite said one end.

* * * * *